Figure 1:
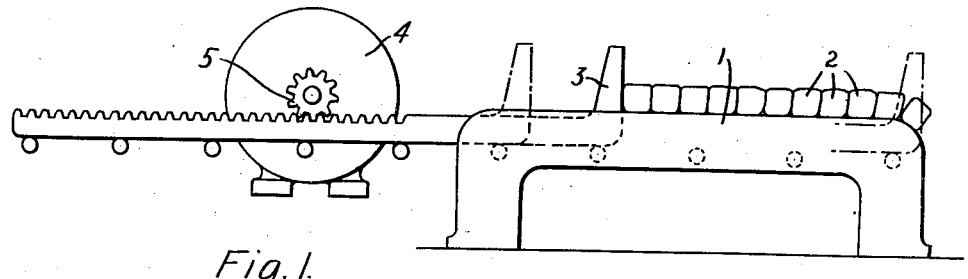

E. A. HANFF.
MOTOR CONTROL SYSTEM.
APPLICATION FILED NOV. 22, 1916.

1,367,138.

Patented Feb. 1, 1921.
2 SHEETS—SHEET 1.

WITNESSES:
Fred. A. Lind.
J. R. Langley.

INVENTOR
Edward A. Hanff
BY
Wesley G. Carr
ATTORNEY

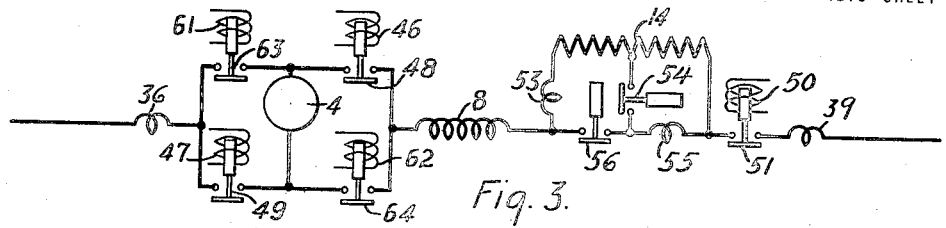
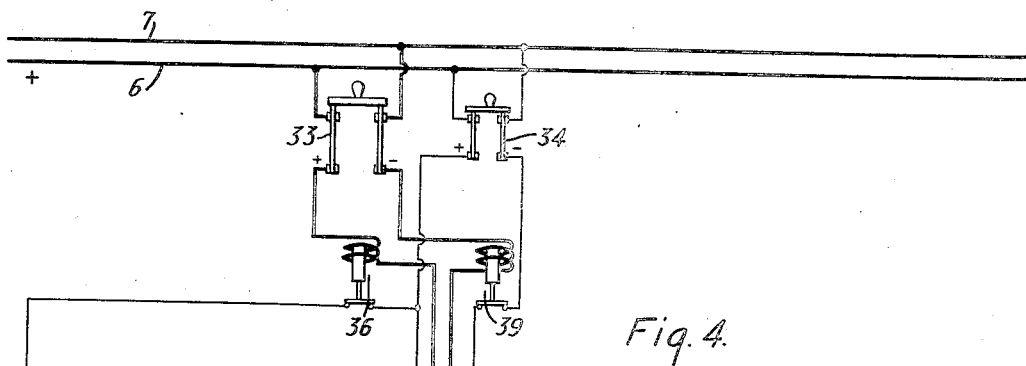
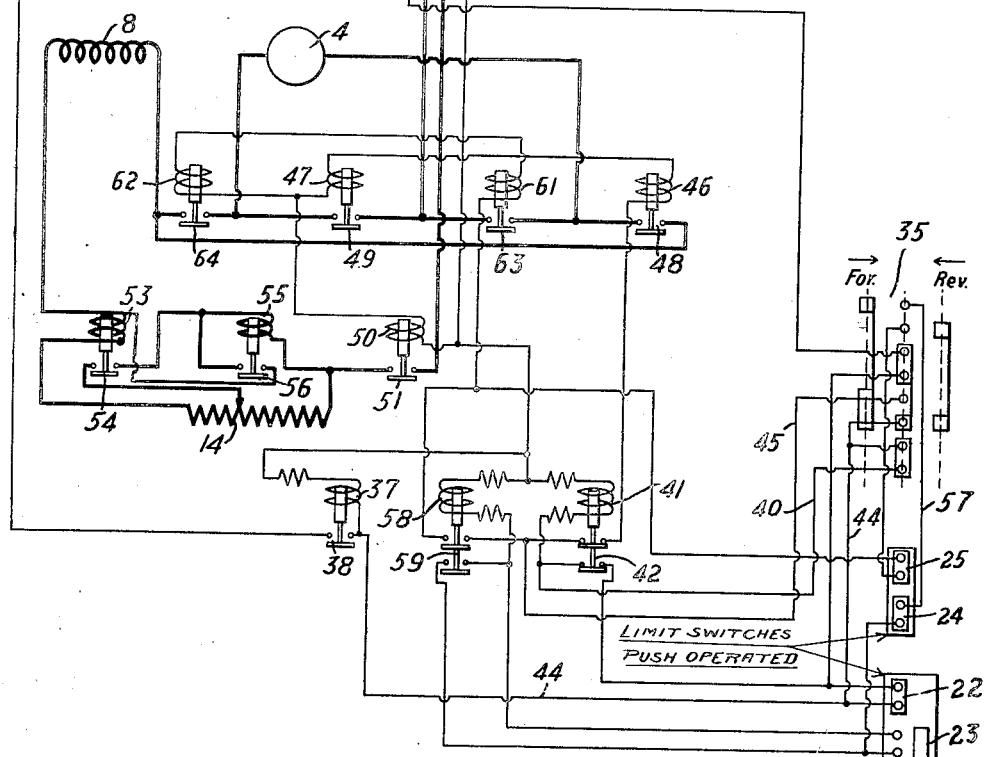

UNITED STATES PATENT OFFICE.

EDWARD A. HANFF, OF IRWIN, PENNSYLVANIA, ASSIGNOR TO WESTINGHOUSE ELECTRIC AND MANUFACTURING COMPANY, A CORPORATION OF PENNSYLVANIA.

MOTOR-CONTROL SYSTEM.

1,367,138.   Specification of Letters Patent.   Patented Feb. 1, 1921.

Application filed November 22, 1916. Serial No. 132,794.

*To all whom it may concern:*

Be it known that I, EDWARD A. HANFF, a citizen of the United States, and a resident of Irwin, in the county of Westmoreland and State of Pennsylvania, have invented a new and useful Improvement in Motor-Control Systems, of which the following is a specification.

My invention relates to motor-control systems and it has particular relation to such systems as are employed in connection with electric motors for driving reciprocating mechanisms such as, for example, bloom pushers or similar apparatus for steel mills.

My invention has for its object to provide a system of the character described above by means of which driven mechanisms may be caused to automatically complete definite cycles of operation, or any desired portions of such cycles, at the will of the operator.

As blooms or billets of steel are formed, in the operation of a steel mill, they are placed upon a table upon which they are allowed to accumulate until they reach a predetermined number, whereupon they are removed from the table by any convenient means and transported to another part of the mill for the succeeding operation. As usually arranged, the mechanism for removing the blooms from the table comprises a reciprocating member that is connected to an electric motor by a rack-and-pinion mechanism.

The actuating member moves in a forward direction to remove the blooms from the table and then returns to its initial position to await the accumulation of other blooms. The apparatus may be operated to remove the blooms one by one as they arrive upon the table or they may be allowed to accumulate as described above.

It is desirable, in the operation of such machines, that the motor actuate the reciprocating member through a complete cycle of operation and come to rest without the necessity of attention on the part of the operator. It is essential, also, that the operator have such control of the motor that the mechanism may be brought to rest in any desired position before it has completed its cycle of operation.

According to the present invention, I provide an arrangement for controlling the electric motor for driving a reciprocating mechanism by means of which the motor may be caused to operate automatically to actuate the reciprocating mechanism through a single complete cycle and come to rest. The controlling mechanism enables the operator to bring the motor and the connected mechanism to rest after any desired portion of the cycle of operation has been completed. The operation of the mechanism is resumed upon a subsequent adjustment of the controlling means to an operative position.

Figure 2:
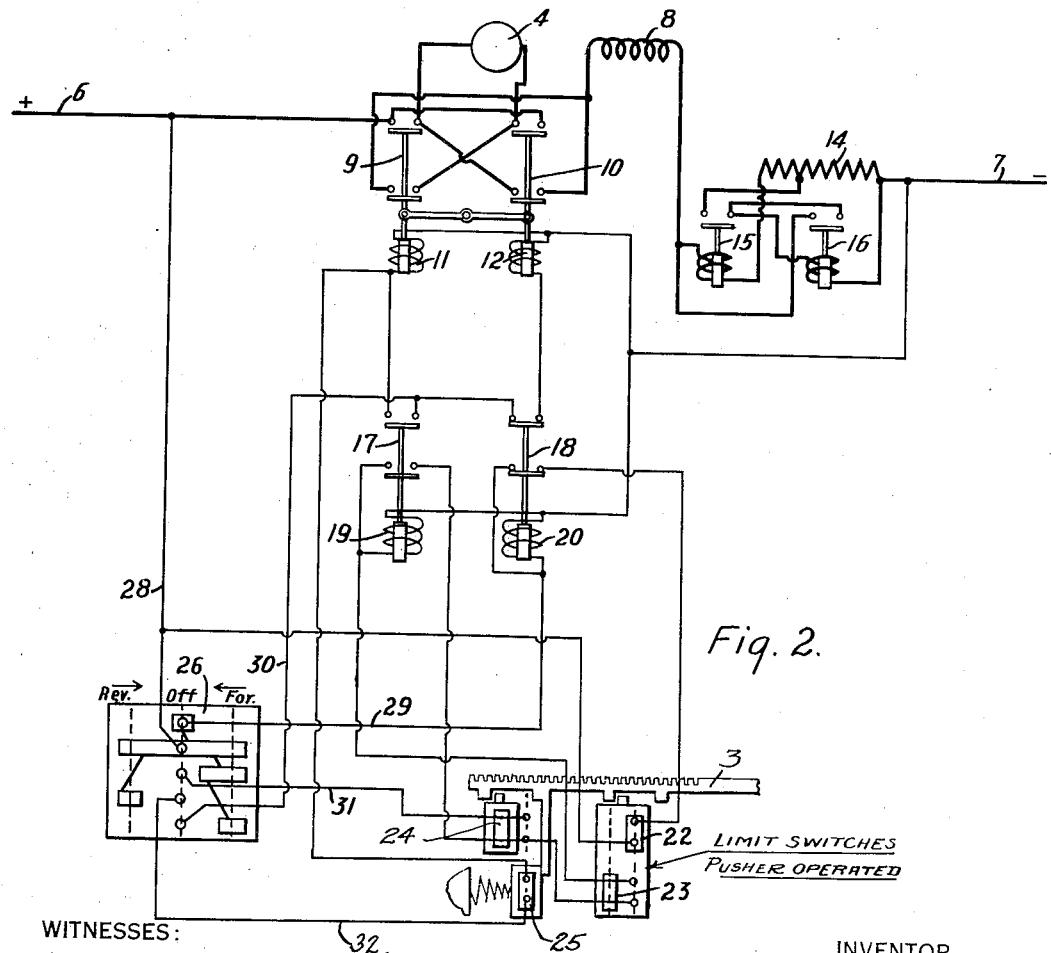

The details of my invention will be described in connection with the accompanying drawings, in which Figure 1 is a conventional representation of a bloom table and pusher and an electric motor operatively connected thereto. Fig. 2 is a diagrammatic view of circuits and apparatus embodying my invention. Fig. 3 is a diagrammatic view of a schematic arrangement of the main circuits of the system of Fig. 4. Fig. 4 is a view, similar to Fig. 2, of a modification.

Referring particularly to Fig. 1, a bloom table 1 is adapted to receive blooms or billets of steel indicated at 2. When the blooms 2 have accumulated in any desired number, they are removed from the table by a pusher 3 that is operatively connected to an electric motor 4 by means of a rack-and-pinion mechanism 5.

Reference may now be had to Fig. 2, in which a system for controlling the motor 4 is diagrammatically illustrated. Line conductors 6 and 7 supply energy to the motor, the armature of which is indicated at 4 and which has a series field-magnet winding 8. The connections of the motor armature are controlled by a pair of double-throw reversing switches 9 and 10 having actuating coils 11 and 12, respectively.

A starting resistor 14, that is in series with the motor armature, is controlled by electromagnetic switches 15 and 16. The circuits of the actuating coils 11 and 12 are controlled by double-pole relays 17 and 18 having actuating coils 19 and 20, respectively.

A pair of limit switches 22 and 23 are actuated by any suitable part of the reciprocating mechanism when the pusher 3 has reached the end of its path of movement in a forward direction. A similar pair of limit switches 24 and 25 are actuated by the pusher 3 at the end of its path of movement in the reverse direction. A manually operable controller 26 effects the operation of the motor in the desired direction, as will be described.

It may be assumed that the pusher 3 occupies the position at the extreme left of the table 1, indicated by dotted lines (Fig. 1). It may be assumed, further, that it is desired to clear the table of such blooms as may have accumulated upon it. When the controller 26 occupies its illustrated or "off" position, a circuit is completed which extends from line conductor 6 through conductor 28, controller 26, conductor 29, and coil 20, to line conductor 7. The relay 18 is accordingly closed, and a holding circuit for the coil 20 is established through the forward limit switch 22. No other circuits are closed by the relay 18 while the various parts are in their respective illustrated positions.

When the controller 26 is actuated to the left, as viewed in Fig. 2, a circuit is completed which extends from line conductor 6 through conductor 28, controller 26, conductor 30, upper contact members of relay 18, and actuating coil 12, to line conductor 7. The reversing switch 10 then closes to complete the motor circuit which extends from line conductor 6 through upper contact members of switch 10, armature winding 4, lower contact members of switch 10, series field-magnet winding 8, actuating coil of switch 15 and starting resistor 14 to line conductor 7. The switch 15 closes to shunt one section of the resistor 14 and to complete a circuit for the actuating coil of switch 16. The latter switch then closes to completely shunt the resistor 14 and accelerate the motor to its normal running speed.

If the controller handle is allowed to remain in the forward position, the motor continues to operate in the forward direction until the pusher head or other reciprocating part actuates the forward limit switches 22 and 23. The switches 22 and 23 are respectively opened and closed at this point in the operation of the mechanism. The opening of switch 22 opens the holding circuit of coil 20 and the relay 18 accordingly opens to break the circuit of actuating coil 12. The reversing switch 10 next opens the armature circuit of the motor.

The closing of switch 23, which occurs slightly subsequent to the opening of switch 22, completes a circuit which extends from conductor 28 through controller 26, conductor 31, limit switch 24, limit switch 23, and coil 19, to line conductor 7. The relay 17 then closes to complete a circuit for the actuating coil 11 of reversing switch 9 which extends from conductor 28 through controller 26, conductor 30, upper contact members of relay 17 and coil 11 to line conductor 7.

The reversing switch 9 then closes to complete the armature circuit of the motor for operation in the reverse direction. If the controller 26 remains in the forward position, the motor operates in the reverse direction to return the pusher 3 to its initial position. The limit switches 24 and 25 are opened by the reciprocating mechanism, and the circuit of actuating coil 19 of relay 17 is opened at limit switch 24. The relay 17 and the reversing switch 9 then open, as described above in connection with the operation of relay 18 and reversing switch 10. The motor accordingly comes to rest.

In order to establish initial conditions for operation in the forward direction or to cause the motor to automatically complete another cycle, it is necessary for the controller 26 to be brought to its illustrated or "off" position to again establish a circuit for the actuating coil of relay 18.

If it is desired to stop the pusher 3 at an intermediate point in its cycle of operation, the controller is actuated to its "off" position to open the circuit of the actuating coil 11 or the actuating coil 12, as the case may be, to effect the opening of the corresponding reversing switch. The motor will resume its operation in the direction which was discontinued upon a subsequent actuation of the controller 26 to its former position. By means of this arrangement, the pusher head may be operated in a step-by-step manner, if it is so desired.

If it is desired to operate the motor 4 in the reverse direction, when the pusher head occupies an intermediate position, the controller 26 is actuated to the right, as viewed in Fig. 2, to establish a circuit which extends from conductor 28 through controller 26, conductor 32, limit switch 25, and coil 11 of reversing switch 9, to line conductor 7. The motor then operates the pusher toward its initial position, and, if the controller remains in the reverse position, the pusher will be returned to the initial position, the motor coming to rest upon the opening of switches 24 and 25, as above described in connection with the automatic cycle of operation.

A modified arrangement of my invention is illustrated in Fig. 4 in which similar reference numerals are employed to designate parts corresponding to those of Fig. 2. When a line switch 33 and a control switch 34 are closed and a controller 35 occupies its illustrated or inoperative position, a circuit is completed which extends from line conductor 6, through switch 34, controller 35, conductor 44, actuating coil 37 of no-voltage relay 38, and overload relay 39 to the negative side of switch 34. The no-voltage relay 38 closes to connect its actuating coil across the terminals of switch 34. It remains in this position except upon failure of voltage in the line or upon operation of the overload relays 36 and 39. The no-voltage relay 38 operates to open the control circuit upon the occurrence of abnormal conditions when the controller is in either of its operative positions. When the relay 38 opens it cannot again be closed until the controller is in its "off" position.

A circuit is also completed which extends from the positive side of switch 34 through controller 35, conductor 40, actuating coil 41 of relay 42, overload relay 39, and switch 34 to line conductor 7. The relay 42 then closes to complete a holding circuit for the coil 41 which extends from no-voltage relay 38, which is connected to the positive side of switch 34, through limit switch 22, lower contact members of relay 42, coil 41 and overload relay 39 to the negative side of switch 34.

When the controller 35 is actuated to the right, as viewed in Fig. 4, a circuit is completed which extends from the positive side of switch 34 through overload relay 36, no-voltage relay 38, conductor 44, controller 35, conductor 45, upper contact members of relay 42, actuating coils 46 and 47 of reversing switches 48 and 49, respectively, actuating coil 50 of line switch 51, and overload relay 39, to the negative side of switch 34.

The line switch 51 and the reversing switches 48 and 49 are closed to complete the motor circuit for rotation in the forward direction. This circuit extends from the positive side of switch 33 through actuating coil of overload relay 36, switch 49, armature 4, switch 48, series field-magnet winding 8, actuating coil 53 of accelerating switch 54, resistor 14, line switch 51, and actuating coil of overload relay 39 to the negative side of switch 33.

The motor now operates in the forward direction. The switch 54 is closed by the circuit above described to complete a shunt circuit for one section of the resistor 14 which comprises the actuating coil 55 of accelerating switch 56 and the latter closes to completely shunt the resistor. When the reciprocating mechanism driven by the motor reaches the end of its path of movement in a forward direction, limit switch 22 is opened and limit switch 23 is closed shortly thereafter.

The opening of limit switch 22 breaks the holding circuit for actuating coil 41 and the relay 42 accordingly opens to interrupt the circuit of actuating coils 46, 47 and 50. The corresponding switches 48, 49 and 51 then open the armature circuit of the motor. The closing of limit switch 23 completes a circuit which extends from the positive side of switch 34, through overload relay 36, no-voltage relay 38, conductor 44, controller 35, conductor 57, limit switch 24, limit switch 23, actuating coil 58 of relay 59, and overload relay 39 to the negative side of switch 34.

The relay 59 closes to complete a shunt circuit for the limit switch 23 which comprises the lower contact members of relay 59. The closing of relay 59 completes another circuit which extends from conductor 44, which is connected to the positive side of switch 34, through the controller 35, conductor 45, upper contact members of relay 59, actuating coils 61 and 62 of reversing switches 63 and 64, respectively, actuating coil 50 and overload relay 39 to the negative side of switch 34.

The switches 63, 64 and 51 are closed to complete the circuit of the motor for operation in the reverse direction. When the reciprocating mechanism driven by the motor reaches the end of its path of movement in the reverse direction, limit switches 24 and 25 are opened to interrupt the circuit of actuating coil 58 of relay 59. The switches controlled by the relay 59 are opened in a manner similar to that described in connection with the relay 42, and the motor is brought to rest at its initial position.

The arrangement of the circuits for operation in the reverse direction, as determined by the adjustment of the controller to the left, as viewed in Fig. 4, differs in no material respect from the corresponding operation of the system of Fig. 2, and the details of such operation are accordingly omitted.

By means of a system of control arranged as above described, I am enabled to operate a driven mechanism through a single complete cycle upon the adjustment of a controlling device to an operative position. The operation of the mechanism may be interrupted at any desired intermediate point, and the operation of the mechanism to complete its cycle is resumed upon the adjustment of the controller to the same position.

While I have illustrated a motor controlled in accordance with my invention as being applied to a reciprocating mechanism, I do not desire to limit the application of my invention in this respect as it is adapted for use in connection with any mechanism which operates through a definite cycle.

I claim as my invention:

1. In a motor-control system, the combination with an electric motor having a definite cycle of operation, of controlling means therefor operable, when a part thereof is adjusted to an operative position, to cause said motor to complete said cycle and come to rest automatically, said means being operable also when said part is removed from said operative position to stop said motor at any desired point during its operation and to cause said motor to complete its cycle of operation when again adjusted to said operative position.

2. The combination with a reciprocating mechanism, a driving motor therefor and a controlling circuit for said motor, of means for controlling said motor comprising a switch, said means being operable when said switch is adjusted to one position, to close said circuit, when said switch is adjusted to another position, to effect the automatic operation of said motor and to actuate said mechanism through a complete cycle, and when said switch is returned to said first position, to effect the stopping of said mechanism at any desired point in the cycle.

3. The combination with a reciprocating mechanism and a driving motor therefor, of means for controlling said motor comprising a switch, said means being operable when the switch is adjusted to one position, to effect the operation of said motor to actuate said mechanism through a complete cycle, and which, when said switch is actuated to a second position during the operation of the motor, effects the stopping of the mechanism at an intermediate point, the operation of the motor being resumed upon a subsequent actuation of the switch to the first position.

4. In a motor-control system, the combination with an electric motor and a pair of reversing switches therefor, of a relay for each of said switches each having an actuating coil, means for energizing said coils to cause the closing of said relays, a switch for each of said coils for maintaining said coils energized, and means for effecting the opening of one of said switches and the closing of the other switch at a predetermined point in the operation of said motor and for effecting the opening of said other switch at a second predetermined point in the operation of said motor.

5. In a motor-control system, the combination with an electric motor and a pair of reversing switches, of a relay for each of said switches each having an actuating coil, means for energizing one of said coils to cause the closing of the corresponding relay, a switch for establishing a holding circuit for said coil, said last-named switch being adapted to be operated at a predetermined point in the operation of said motor to break said holding circuit and means for thereupon energizing said other coil to cause the closing of said other relay, said last-named means comprising a switch which is adapted to establish a holding circuit for said second coil, said last-named switch being adapted to be operated at a second predetermined point in the operation of said motor to break said second-named holding circuit.

6. In a motor-control system, the combination with an electric motor, of plural-position means for controlling the direction of operation of said motor, a pair of switches adapted to be actuated at a predetermined point during operation of said motor in one direction, a pair of switches adapted to be actuated at a predetermined point during the operation of said motor in the opposite direction, one of said first pair of switches governing the operation of said motor in one direction and the other of said first pair of switches and one of said second pair of switches governing the operation of said motor in the other direction when said plural-position means occupies one of its positions, and the other of said second pair of switches governing the operation of said motor in said other direction when said plural-position means occupies another of its positions.

7. In a motor-control system, the combination with an electric motor, a pair of reversing switches therefor and a relay for each of said switches, of a drum controller operable to cause the closing of one of said relays when it occupies one position and to successively cause the closing of one of said reversing switches, the opening of said one relay, the opening of said one switch, the closing of said other relay, the closing of said other switch, the opening of said other relay and the opening of said other switch when said controller occupies another position.

8. In a motor-control system, the combination with an electric motor and a source of current and a controlling circuit therefor, of a controller adapted to cause the closing of said circuit when it occupies one position and to start the motor when it occupies another position, means for opening said circuit to disconnect the motor from said source under predetermined conditions, and means for preventing the reclosing of said circuit until said controller again occupies said first-named position.

9. In a motor-control system, the combination with an electric motor, of reversing switches for said motor, relays for controlling said switches, a manually operable switch which, in its normal position, closes a circuit for actuating one of said relays, limit switches for controlling said relays, and means operatively connected to said motor for actuating said limit switches at predetermined points in the operation of said motor.

In testimony whereof, I have hereunto subscribed my name this 8th day of Nov., 1916.

EDWARD A. HANFF.